United States Patent [19]
Mikami et al.

[11] Patent Number: 4,753,505
[45] Date of Patent: Jun. 28, 1988

[54] OPTICAL THERMOOPTIC SWITCH DEVICE

[75] Inventors: Kazuo Mikami, Kyoto; Masanobu Koide, Yawata; Taro Watanabe, Takatsuki, all of Japan

[73] Assignee: Omron Tateisi Electronics Company, Kyoto, Japan

[21] Appl. No.: 814,158

[22] Filed: Dec. 23, 1985

Related U.S. Application Data

[63] Continuation of Ser. No. 514,252, Jul. 15, 1983, abandoned.

[30] Foreign Application Priority Data

Jul. 15, 1982 [JP] Japan .................... 57-124106

[51] Int. Cl.$^4$ .............................................. G02B 6/10
[52] U.S. Cl. .............................. 350/96.13; 350/96.14; 350/96.12
[58] Field of Search ............... 350/96.10, 96.11, 96.12, 350/96.13, 96.14, 96.15, 96.29, 96.30, 363, 353, 354

[56] References Cited

U.S. PATENT DOCUMENTS

| | | | |
|---|---|---|---|
| 3,947,087 | 3/1976 | Furuta et al. | 350/96.12 |
| 4,145,121 | 3/1979 | Hata et al. | 350/96.14 X |
| 4,160,579 | 7/1979 | Milton | 350/96.14 |
| 4,283,113 | 8/1981 | Eden | 350/96.15 |
| 4,648,686 | 3/1987 | Segawa | 350/96.13 |
| 4,648,687 | 3/1987 | Yoshida et al. | 350/96.13 |

FOREIGN PATENT DOCUMENTS

| | | | |
|---|---|---|---|
| 52-70852 | 6/1977 | Japan | 350/96.15 |
| 54-66156 | 5/1979 | Japan | 350/96.13 |
| 1438961 | 6/1976 | United Kingdom | 350/96.29 |

OTHER PUBLICATIONS

Guglielmi et al., "Optical Bistability in LiNbO$_3$ ... Detector" Proceed, 1st Eur. Conf. on Int. Opt., 9/81, pp. 61-62.
Haruna et al., "Thermo-Optic Effect ... Switching", Elect. Lett., vol. 14, No. 9, pp. 283-284, 4/78.
Soref et al., "Multimode 2×2 Optical Crossbar Switch ...", Elect. Lett., vol. 14, No. 9, pp. 283-284, 4/78.

Primary Examiner—William L. Sikes
Assistant Examiner—Brian M. Healy
Attorney, Agent, or Firm—Cushman, Darby & Cushman

[57] ABSTRACT

An optical waveguide path and an optical branch path branching from the waveguide path are formed in an optical material which is variable in refractive index with the variation of temperature. A heat generator is provided in the vicinity of the branching portion of the waveguide path. The heat of the generator produces in the optical material a temperature gradient in a direction parallel with a plane including the waveguide path and the branch path. The temperature gradient gives the optical material a temperature gradient, by which a light beam propagating through the waveguide path is deflected for switching.

13 Claims, 7 Drawing Sheets

OPTICAL THERMOOPTIC SWITCH DEVICE

This is a continuation of application Ser. No. 514,252, filed July 15, 1983, which was abandoned upon the filing hereof.

BACKGROUND OF THE INVENTION

The present invention relates to an optical switch device making use of an optical material which varies in refractive index with the variation of temperature, and more particularly to an optical switch device which is suited to light beams of multimode.

Change-over control for light beams has heretofore been practiced with use of a material having opto-electric effect or opto-magnetic effect. An electric field or magnetic field is applied to an optical waveguide layer made of such a material to vary the refractive index of the layer and thereby change the direction of propagation of a light beam travelling through the layer. However, the optical switch device of this type is usable only for light beams of single mode propagating through an optical waveguide layer which is about 2 to about 5 μm in thickness or depth because the electric field or magnetic field attenuates to a greater extent with increasing depth from the surface of the material inward and also because a very high voltage or great current is required for generating an electric field or magnetic field sufficient for deflecting light beams over a depth of more than 200 μm. There is another problem. While the optical waveguide layer is formed by thermally diffusing an impurity substance into a dielectric material from its surface which material has an opto-electric effect or opto-magnetic effect, it is extremely difficult to form in the dielectric material a multimode optical waveguide layer having a thickness of more than 200 μm.

SUMMARY OF THE INVENTION

An object of the present invention is to provide an optical switch device for changing the direction of propagation of large-diameter single-mode light beams as well as of small-diameter multimode light beams.

The optical switch device of the present invention is characterized in that the device comprises an optical waveguide path having an optical branch path and being formed in an optical material variable in refractive index with the variation of temperature, and means for producing in the optical material in the vicinity of the branching portion of the waveguide path a temperature gradient in a direction perpendicular to the axis of the waveguide layer and parallel with a plane containing the waveguide path and the branch path.

Most generally, the temperature gradient producing means is a heat generator provided in the vicinity of the branching portion of the waveguide path.

The heat applied to the optical material by the heat generator is transmitted to a deep portion of the material to result in a distribution of temperatures in the interior of the optical material over the material's depth. The temperature distribution produces a distribution of refractive indexes, which deflects light for switching. Thus it becomes possible to deflect a light beam of large diameter propagating through an optical waveguide, i.e., a multimode optical waveguide path, hence switching for a multimode light beam. Moreover, the heat generator can be energized for heating with a lower power than is required for generating the electric or magnetic field conventionally used. Since the light beam is deflected by the temperature gradient, the deflection is easily controllable without the problem involved with control by a magnetic or electric field in which the angle of deflection alters with the polarization direction of light. Although a light beam spreads out when propagated through an optical waveguide layer, presenting difficulty in assuring controlled deflection, this problem can be eliminated when an optical waveguide path is formed in the optical material.

Other features of the present invention will become more apparent from the following description of embodiments with reference to the accompanying drawings.

DESCRIPTION OF THE PREFERRED EMBODIMENTS

Figure 1:
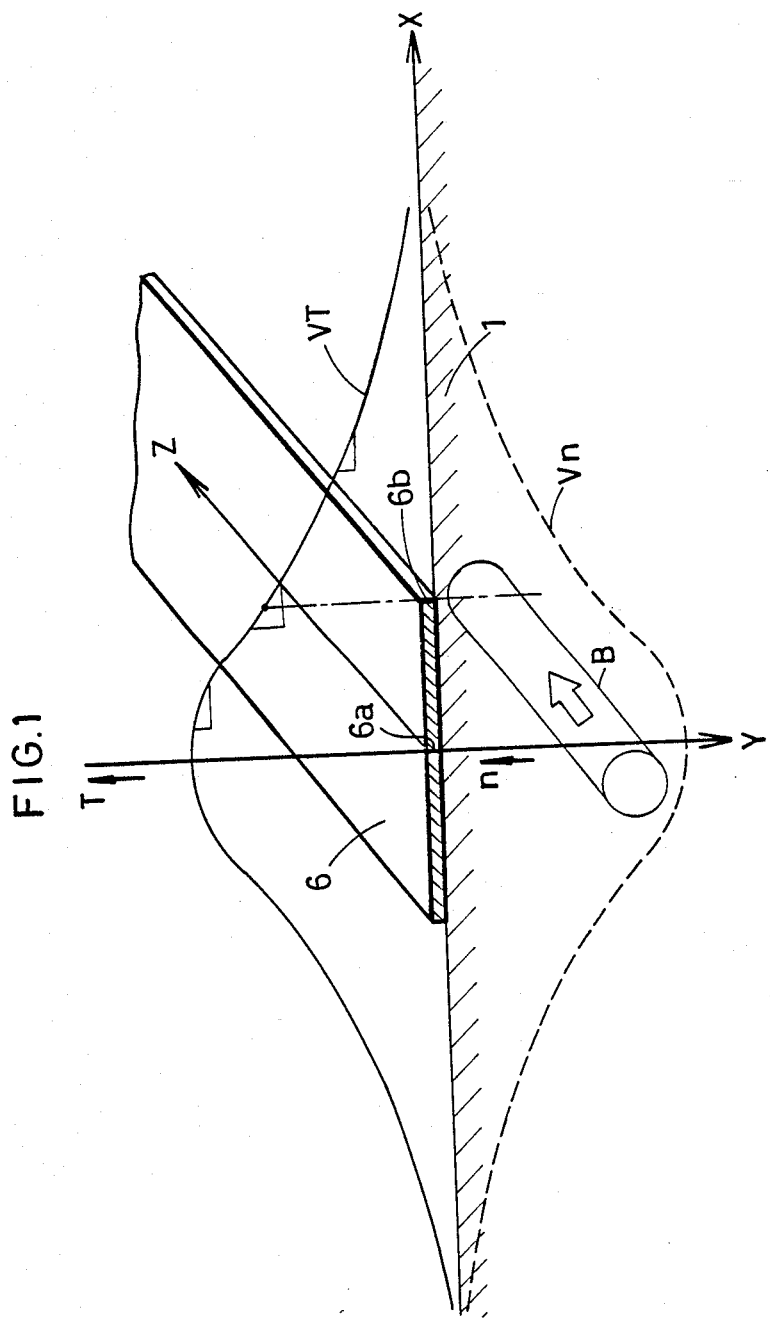
FIGS. 1 and 2 are diagrams for illustrating the principle of the present invention, FIG. 1 showing a temperture distribution and FIG. 2 a refractive index distribution.

FIG. 1 shows varations in refractive index resulting from variations in temperature. A heat generator 6 is formed by vacuum evaporation on the surface of a dielectric material 1 the refractive index of which varies with variations in temperature. The heat generator 6 has a given width (in the X direction) and extends in the Z direction. Indicated at VT is a temperature distribution produced at a predetermined depth within the dielectric material when the heat generator 6 is energized. The temperature distribution Vt is uniform in the Z direction. Although the temperature lowers with increasing depth (in Y direction), this need not be considered herein. With the temperature distribution VT, the temperature T, which is highest at the center 6a of the heat generator 6, lowers toward the X and −X directions. The gradient of temperature T in the X direction, $\partial T/\partial X$, is greatest near a side 6b of the generator 6. The temperature distribution VT gives rise to a refractive index distribution within the dielectric material 1. For example when the material 1 is a high polymer film, the variations of refractive index with temperature are negative, and the refractive index distribution thereof is indicated at Vn in FIG. 1. If the material is glass, the variations are positive, and the refractive index distribution thereof is similar to the temperature distribution VT. With the refractive index distribution Vn, the refrative index n is smallest at the center 6a of the heat generator 6.

When a light beam B is incident in the Z direction on the dielectric material 1 having such a refractive index distribution Vn, at a position where $\partial T/\partial X$ is maximum, the beam is deflected in the direction (X direction) toward which the refractive index n is greater. The angle of deflection, $\theta$, at this time is expressed by the following equation.

$$\theta = -\frac{\partial n}{\partial T} \cdot \frac{\partial T}{\partial x} \cdot L$$

wherein L is the length of the heat generator 6 in the Z direction. The differential $\partial T/\partial X$ of the refractive index relative to the temperature is a constant value dependent on the dielectric material 1. If the length L is definite, the temperature gradient $\partial T/\partial X$ in the X direction must be great in order to increase the angle of deflection $\theta$. For this reason, the beam B is made incident at the position where $\partial T/\partial X$ is maximum as mentioned above.

Figure 2:
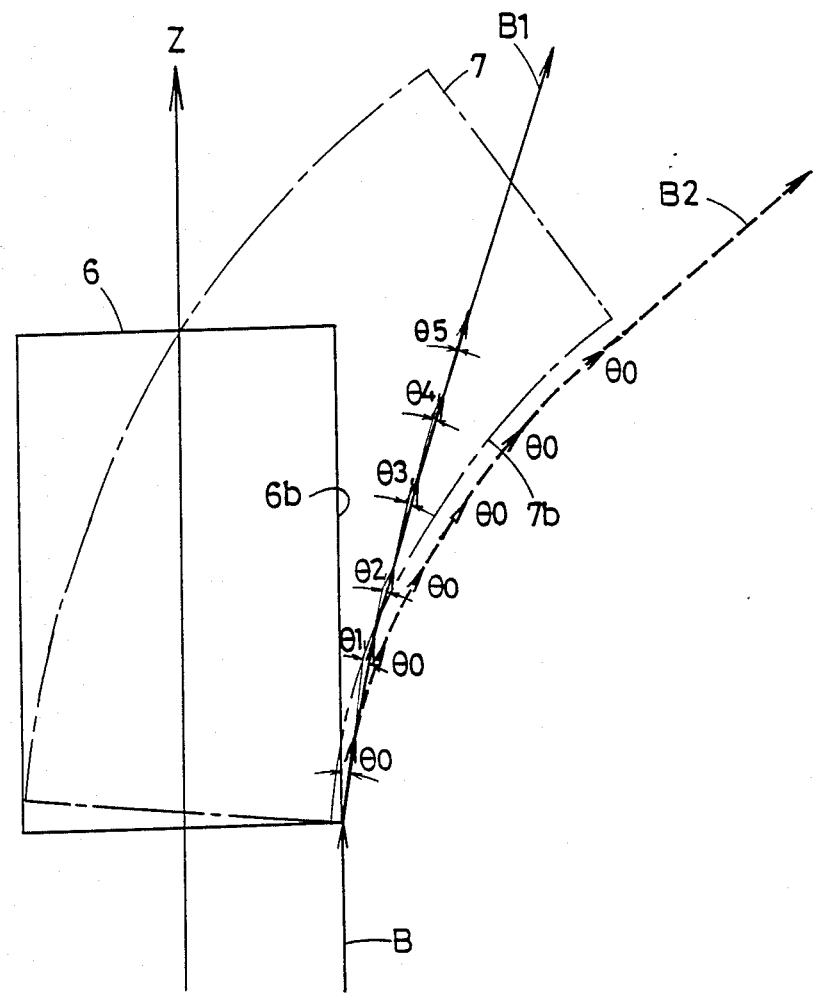

FIG. 2 shows how a light beam b1 is deflected within the dielectric material 1 when the beam is incident in the Z direction on the material in the vicinity of the side of the heat generator 6 where $\partial T/\partial X$ is maximum. The light beam is continuously deflected at every point that the beam passes, in accordance with $\partial T/\partial X$ at the point. The angles of deflection at typical points are designated by $\theta 0, \theta 1, \theta 2, \ldots, \theta 5$. Since the beam B1 advances in the Z direction while being deflected towards the X direction, $\partial T/\partial X$ decreases and the angle of deflection also decreases with the advance, hence the relation of $\theta 0 > \theta 1 > \theta 2 \ldots > \theta 5$. Accordingly if the side 6b of the generator 6 is straight, the greatest temperature gradient can not be utilized over the entire length of the generator.

Thus it is desirable to use a heat generator 7 shown in FIG. 2 and having a circular arc side 7b so that a light beam B2 advancing while being deflected passes points where the temperature gradient $\partial T/\partial X$ is always greatest. In this case, the beam B2 propagates while being deflected at the greatest angle $\theta 0$ over the entire length of the side 7b of the generator 7, with the result that the beam can be deflected at a large angle.

Because the refractive index distribution is similar to the temperature distribution VT in the case where the dielectric material 1 is glass as already stated, a light beam is deflected in a direction ($-$X direction) opposite to the direction shown in FIG. 2. Accordingly the heat generator is made to have a circular arc side which is curved in the opposite direction.

The optical switch device of the present invention utilizes the characteristics that when a dielectric material is heated by a heat generator, a light beam propagating through the material is deflected at an angle determined by the refractive index distribution according to the resulting temperature distribution and that when the heat generator is not energized, an incident beam advances straight through the material which has a uniform temperature.

Figure 3:
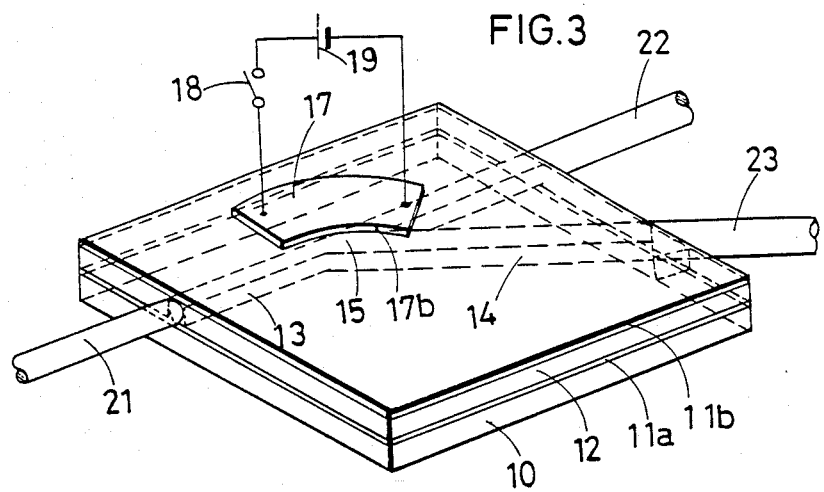
FIGS. 3 and 4 show an embodiment of the invention, FIG. 3 being a perspective view and FIG. 4 a plan view.
Figure 4:
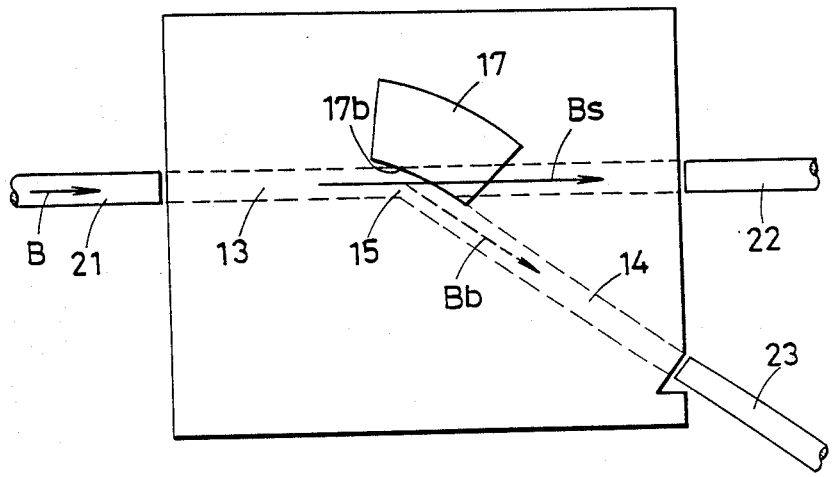

FIGS. 3 and 4 show an optical switch device having a multimode optical waveguide path. The device is fabricated in the following manner. A low refractive index layer 11a of acrylic resin is formed over a substrate 10, and a layer 12 of high polymer film (e.g. polycarbonate film) having a thickness of 200 μm is further formed over the layer 11a by casting. The high polymer layer 12 has incorporated therein methyl acrylate serving as a monomer of low refractive index. The portions of the layer 12 where an optical waveguide path 13 and a branch path 14 (each having a width of 200 μm) are to be formed are masked, and the other portion of the layer 12 is irradiated with ultraviolet rays to polymerize the monomer. With the mask thereafter removed, the monomer is released from the masked portions of the layer 12 by vacuum suction. A coat layer 11b of low refractive index is further formed over the high polymer film layer 12. As a result, a straight optical waveguide path 13 and an optical waveguide branch path 14 branching from the path 13 at a specified angle are formed on the substrate 10. These paths 13 and 14 have a higher refractive index than the neighboring portion and are each 200 μm in width and thickness (depth).

In the vicinity of the branching portion 15, Ni-Cr is deposited on the coat layer 11b by vacuum evaporation to provide a heat generator 17 (for example, 2000 Å in thickness). The heat generator 17 is connected at its opposite ends to a d.c. power supply 19 via a switch 18. The generator has a circular arc side 17b, which extends at a part thereof along the straight path 13, then crosses the branching portion 15 and further extends along the branch path 14. The curvature of the circular arc side 17b of the generator 20 and the branching angle of the branch path 14 relative to the straight path 13 are determined based on the principle of deflection of light due to the refractive index distribution already described.

One end of an input optical fiber 21, 200 μm in core diameter, is connected directly to the input end of the optical waveguide path 13. Output optical fibers 22 and 23, similarly having a core diameter of 200 μm, are connected each at its one end directly to the output ends of the paths 13 and 14, respectively. While optical fibers generally comprise a core, a cladding layer covering the core and, when required, a protective covering over the cladding layer, cores only are shown as optical fibers in all the drawings following FIG. 3.

When the switch 18 is off with no d.c. voltage applied to the heat generator 17, the generator produces no heat, with the result that the optical waveguide paths 13, 14 and neighboring portions thereof are maintained at a uniform temperature. Accordingly a light beam incident on the waveguide path 13 from the input fiber 21 almost entirely advances straight through the path 13 to the output fiber 22 without separately advancing into the branch path 14 (light beam Bs).

When the switch 18 is turned on to energize the generator 17 and cause the generator to produce heat, a temperature distribution occurs at the branching portion 15 to produce a refractive index gradient. As described above, the gradient is greatest in the vicinity of the side 17b of the heat generator 17. Consequently the light beam incident on the path 13 is almost entirely deflected along points of maximum refractive index, enters the branch path 14 and advances to the output fiber 23 (light beam Bb). Since the portion of the path 13 beneath the generator 17 toward its outlet side has a lower refractive index than the branching portion 15, little or no light passes through the former portion. With the low refractive index layers 11a and 11b present beneath and on the paths 13 and 14, a slight refractive gradient will give rise to no problem even if produced due to a temperature gradient in the vertical direction (i.e. aforementioned Y direction).

Figure 5:
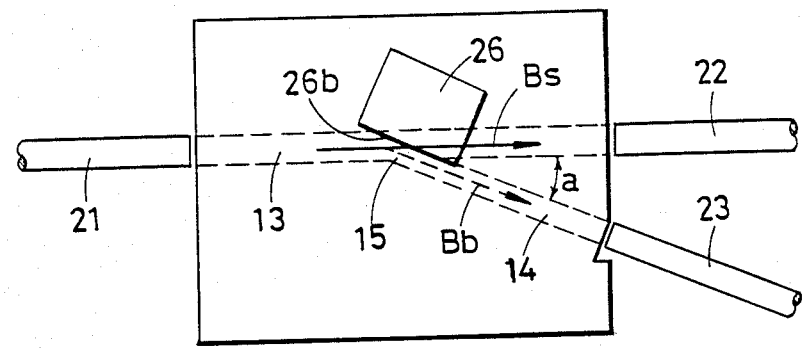
FIGS. 5 to 9 are plan views showing modifications.

FIG. 5 shows a modification including a rectangular heat generator 26 having a straight side 26b, which obliquely crosses the waveguide path 13 and extends along the branch path 14. When the branching angle a of the branch path 14 with respect to the path 13 is small, characteristics similar to those of the optical switch of FIGS. 3 and 4 can be obtained even with use of the generator 26 having such a straight side 26b.

Figure 6:
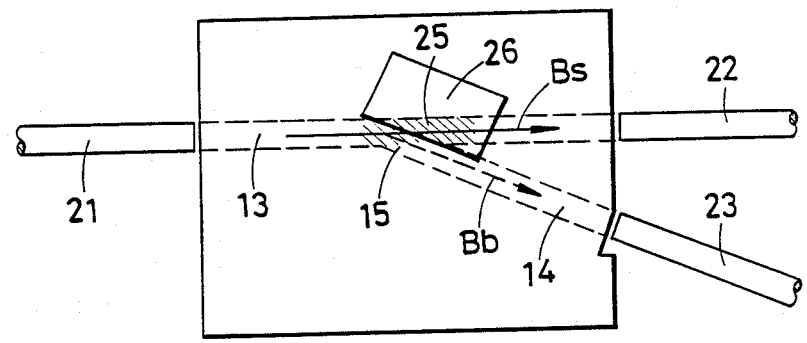

FIG. 6 shows another modification, in which the portion 25 (hatched) of the waveguide path 13 near the branching portion 15 has a higher refractive index than the other portions of the paths 13 and 14. When a light beam Bs is advanced straight without heating the generator 26, leakage of light to the branch path 14 can be prevented since the portion 25 is higher than the path 14 in refractive index.

Figure 7:
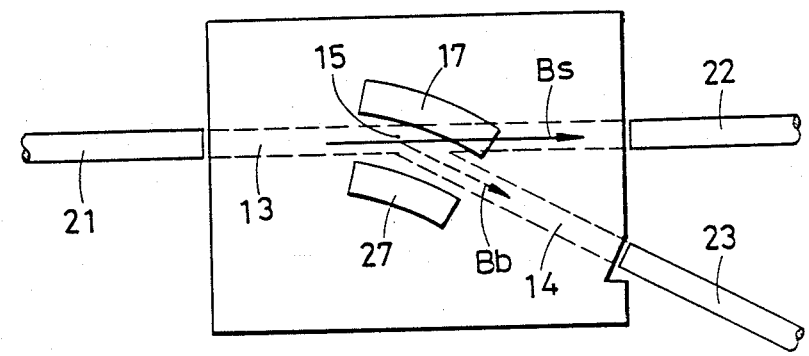

FIG. 7 shows another modification. In addition to the heat generator 17 (FIG. 4), another heat generator 27 is disposed on the other side of the branching portion 15 as opposed to the generator 17. When the generator 17 is energized to produce a refractive index distribution, a light beam is deflected and advances into the waveguide path 14. At this time, the branching portion 15 and the waveguide path 14 become lower in refractive index as already stated (see FIG. 1). Consequently there is the likelihood that the deflected beam will partly leak from the path 14 to outside (toward the generator 27). Accordingly the heat generator 27 is provided to render the outside portion of the path 14 further lower in refractive index and prevent the leakage. The generator 27 is energized simultaneously with the generator 17.

Figure 8:
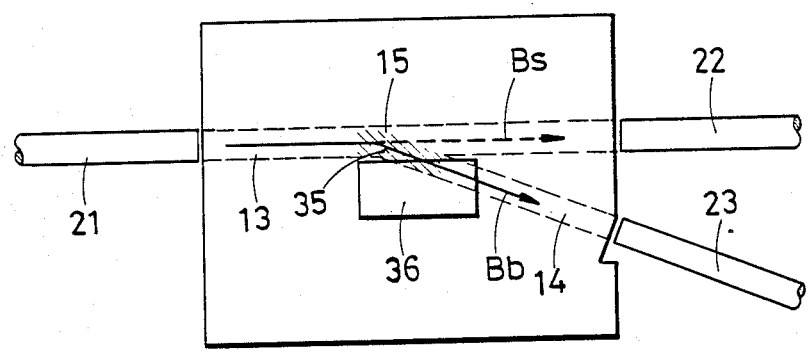

FIG. 8 shows another modification, wherein a rectangular heat generator 36 is provided in parallel with the optical waveguide path 13 toward the branch path 14. A high refractive index portion 35 extends from the branching portion 15 to the branch path 14. When the heat generator 36 is not energized, an incident light beam is guided into the branch path 14 via the portion 35 of high refractive index. When the heat generator 36 is energized to heat the waveguide path, the refractive index of the portion 35 lowers, permitting the light beam to advance straight through the path 13.

Figure 9:
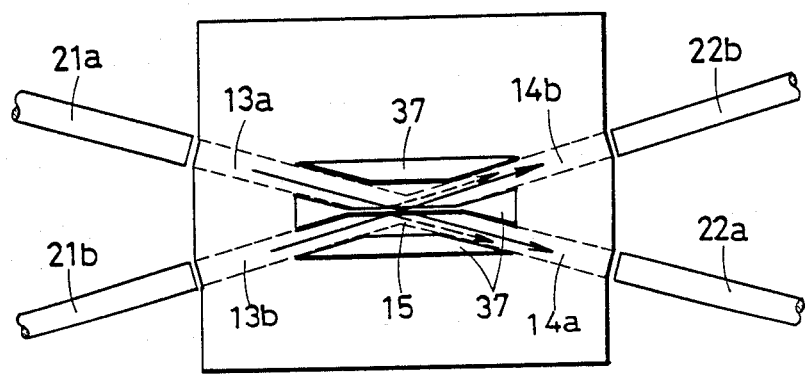

FIG. 9 shows another modification, wherein two optical waveguide paths intersect each other. The portions of the paths extending from the intersection 15 are indicated at 13a, 13b, 14a and 14b. The waveguide path portions 13a and 14a are in alignment, while the other waveguide path portions 13b and 14b are also in alignment. Heat generators 37 are so formed as to surround the intersection in a rectangular form. The heat generators are not formed on the paths 13a, 13b, 14a and 14b except for the generator of reduced width extending across the intersection from input side to output side.

When the generators 37 are not energized, light beams advance straight through the paths. Stated more specifically, the light beam guided through an input optical fiber 21a advances from the path 13a to the path 14a via the intersection 15 and then toward an output optical fiber 22a. Similarly, the light beam from an optical fiber 21b propagates through the paths 13b and 14b and advances into an optical fiber 22b. When the heat generators 37 are energized, the light beams are deflected at the intersection 15. The beam through the path 13a advances into the path 14b, while the beam propagating through the path 13b advances into the path 14a.

FIGS. 10 to 15 show other embodiments of the present invention. The optical waveguide paths of the embodiments of FIGS. 3 to 9 are made of a high polymer film, while the optical waveguide paths are made of glass in the case of the optical switches of FIGS. 10 to 15. Because the variations of refractive index of glass are positive as already stated, the direction of deflection of light beams is reverse to that in the high polymer film.

Figure 10:
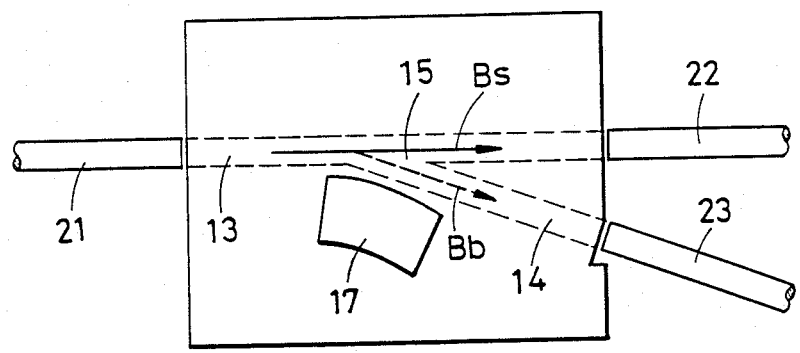
FIGS. 10 to 15 are plan views showing other embodiments.
Figure 11:
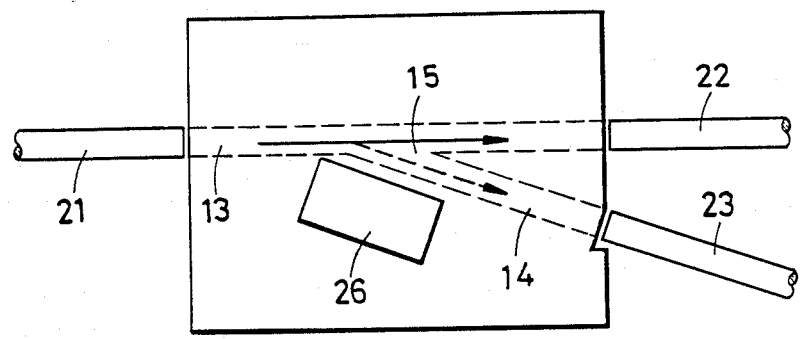
Figure 12:
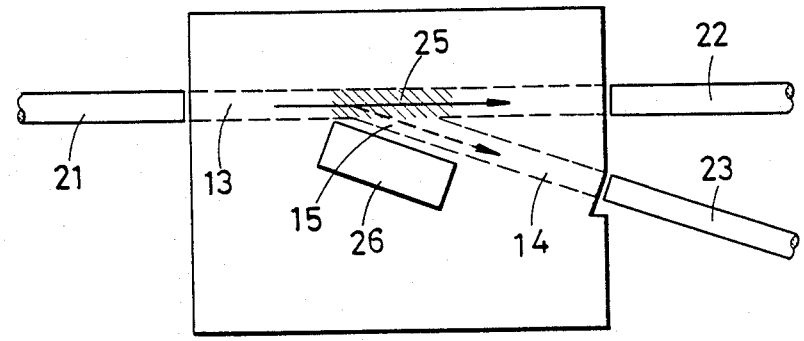

The optical switch device shown in FIG. 10 corresponds to the one shown in FIGS. 3 and 4, the optical switch of FIG. 11 to the one shown in FIG. 5, and the optical switch of FIG. 12 to the one shown in FIG. 6. These switches function in exactly the same manner as those shown in FIGS. 3 to 6 except that the heat generators are provided in opposite relation to the latter switches with respect to the branching portion 15.

Figure 13:
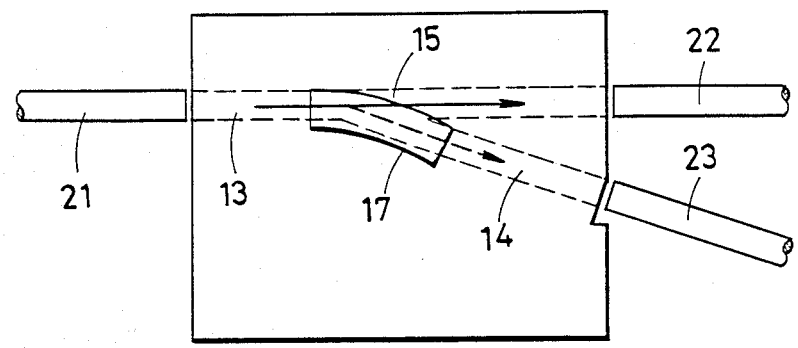

The optical switch shown in FIG. 13 corresponds to the one shown in FIG. 7. The heat generator 17 is provided immediately above the branching portion 15 through the optical branch path 14. When the generator 17 is energized, the refractive index of the waveguide portion immediately therebelow becomes higher, so that the light beam is guided into the branch path 14 without leaking from the path 14.

Figure 14:
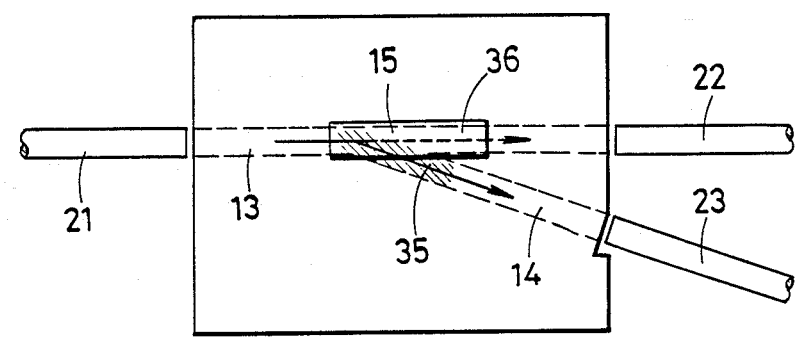

The optical switch shown in FIG. 14 corresponds to the one shown in FIG. 8. A heat generator 36 is formed immediately above the waveguide 13 in alignment therewith. When the heat generator 36 is unenergized, the light beam is guided through a portion 35 of high refractive index and led into the branch path 14. When the generator 36 is energized, the refractive index of the waveguide portion beneath the generator 36 becomes higher, permitting the beam to advance straight through the path 13.

Figure 15:
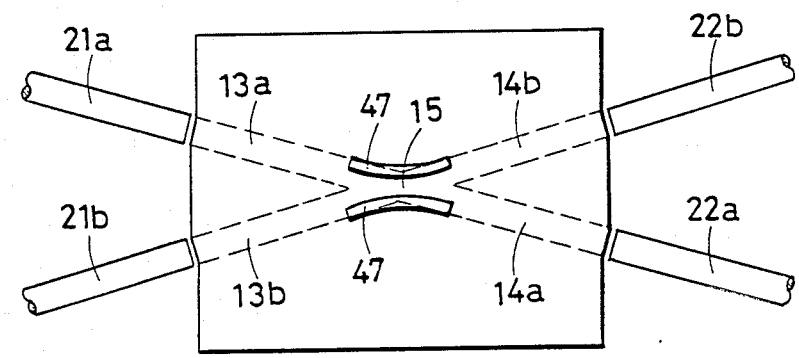

The optical switch shown in FIG. 15 corresponds to the one shown in FIG. 9. Heat generators 47 are provided immediately above the waveguide path at the intersection 15 along the outer sides thereof. This optical switch functions in the same manner as the one shown in FIG. 9.

Although the heat generator in any of the foregoing embodiments is formed on the upper side of the layer formed with the waveguide path (e.g. the high polymer film layer 12 in FIG. 13), it may be formed on the lower side of the layer. It is more preferable to form the heat generator on each of the upper and lower sides since this assures a substantially uniform temperature distribution in the direction of depth. Furthermore, it is possible to provide the generator at the midpoint of the depth of the waveguide.

Although the optical branch path 14 is continuous with the waveguide path 13, a layer of low refractive index about 5 to about 20 μm in length may be interposed between the paths. This eliminates the leakage of light to the branch path 14 when the beam advances straight through the waveguide path 13.

Although the branch path 14 branches from an intermediate portion of the waveguide path 13 which is linear, two optical branch paths can be branched from one end of a single optical waveguide path in a Y form.

While the optical waveguide paths of the above embodiments are made of a high polymer film or glass, electrochemical monocrystal, polycrystal thereof, amorphous material, etc. can be alternatively used as the material which is variable in refractive index with variations in temperature. Needless to say, the present invention is useful not only for multimode light beams but also for single-mode light beams.

What is claimed is:

1. An optical switch device comprising:
   an optical material variable in refractive index with a variation of temperature,
   a first optical waveguide path formed in said optical material along the surface thereof,
   a second optical waveguide path branching off said first optical waveguide path and formed in said optical material along the surface thereof; and
   a heat generator for producing a temperature gradient in a direction parallel with the surface of said optical material and perpendicular to a direction of propagation of a light beam propagating through the waveguide path portion from said first optical waveguide path to said second optical waveguide path, said heat generator being provided in such position that said temperature gradient produced by said heat generator causes the light to be deflected from said first optical waveguide path to said second optical waveguide path and said heat generator having a shape such that the light beam advancing while being deflected from said first optical waveguide path to said second optical waveguide path passes points where the temperature gradient is always greatest.

2. An optical switch device as defined in claim 1 wherein the heat generator is formed on any one of said first optical waveguide path and said second optical waveguide path.

3. An optical switch device as defined in claim 1 wherein the heat generator is provided beside said first and second optical waveguide paths.

4. An optical switch as defined in claim 1 wherein said optical material is a high polymer film.

5. An optical switch as defined in claim 1 wherein said optical material is glass.

6. An optical switch as defined in claim 1 wherein said first and second optical waveguide paths and the branching portion thereof are for multimode use.

7. An optical switch as defined in claim 1 wherein said first and second optical waveguide paths and the branching portion thereof are for single mode use.

8. An optical switch as defined in claim 1 wherein said first and second optical waveguides intersect each other.

9. An optical switch device comprising:
an optical material variable in refractive index with a variation of temperature,
a main optical waveguide path formed in said optical material for leading a light beam,
at least two branch optical waveguide paths formed in said optical material and branching from one end of said main optical waveguide path,
means for producing in said optical material in the vicinity of a branching portion where one of said branch optical waveguide paths branches from said main optical waveguide path a temperature gradient to lead said light beam to one of said branch optical waveguide paths based on refractive index distribution according to said temperature gradient, and a high refractive index portion formed in said branching portion of said optical waveguide paths for leading said light beam to the other one of said branch optical waveguide paths and for preventing said light beam from leaking out from said other one branch optical waveguide path to said one branch optical waveguide path, when the temperature gradient is not produced by said temperature gradient producing means.

10. An optical switch as defined in claim 9, wherein said means for producing a temperature gradient has one side disposed along any one of said main optical waveguide path and said at least two branch optical waveguide paths.

11. A light deflecting device comprising:
an optical waveguide layer formed in an optical material variable in refractive index with a variation of temperature, and
means for producing in the optical waveguide layer a temperature gradient in a direction parallel with the waveguide layer and perpendicular to a direction of propagation of a light beam propagating through the waveguide layer, said temperature gradient producing means comprising a heat generator provided at a location where the light beam is to be deflected, said heat generator having a shape such that the light beam, when advancing while being deflected, passes points where said temperature gradient is always greatest.

12. An optical switch device comprising:
an optical material variable in refractive index with a variation of temperature,
an optical waveguide formed in said optical material,
means for producing in said optical material a temperature gradient, and
low refractive index portions, made of solid substance having a relatively low refractive index compared with that of said optical waveguide, provided beneath and on said optical waveguide for confining a light beam within said optical waveguide, despite production of a slight refractive gradient in the vertical direction due to said temperature gradient, and for preventing leakage of the light beam.

13. An optical switching device as defined in claim 1 wherein said heat generator has a circular arc side.

* * * * *